US008606960B2

(12) United States Patent
Johnson et al.

(10) Patent No.: US 8,606,960 B2
(45) Date of Patent: Dec. 10, 2013

(54) METHOD AND APPARATUS FOR IMPROVING PACKET PROCESSING

(75) Inventors: Erik J. Johnson, Portland, OR (US); David M. Putzolu, Forest Grove, OR (US); Bernie Keany, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 2593 days.

(21) Appl. No.: 10/315,802

(22) Filed: Dec. 9, 2002

(65) Prior Publication Data

US 2004/0111522 A1   Jun. 10, 2004

(51) Int. Cl.
*G06F 15/173* (2006.01)

(52) U.S. Cl.
USPC .......................................... 709/238; 709/201

(58) Field of Classification Search
USPC .......... 709/201, 212, 213, 214, 215, 216, 238
See application file for complete search history.

(56) References Cited

U.S. PATENT DOCUMENTS

| | | | | |
|---|---|---|---|---|
| 4,912,656 A | * | 3/1990 | Cain et al. | 709/242 |
| 5,475,823 A | * | 12/1995 | Amerson et al. | 711/169 |
| 5,889,947 A | * | 3/1999 | Starke | 709/213 |
| 6,215,772 B1 | * | 4/2001 | Verma | 370/236 |
| 6,523,173 B1 | * | 2/2003 | Prosser et al. | 717/152 |
| 6,587,857 B1 | * | 7/2003 | Carothers et al. | 707/602 |
| 6,842,425 B1 | * | 1/2005 | Mannepalli et al. | 370/238 |
| 6,904,017 B1 | * | 6/2005 | Meempat et al. | 370/238 |
| 6,957,265 B2 | * | 10/2005 | Porotsky | 709/231 |
| 6,963,828 B1 | * | 11/2005 | McDonald et al. | 703/22 |
| 7,349,427 B1 | * | 3/2008 | Canning et al. | 370/466 |
| 2001/0053149 A1 | * | 12/2001 | Mo et al. | 370/389 |
| 2002/0143929 A1 | * | 10/2002 | Maltz et al. | 709/224 |
| 2003/0043848 A1 | * | 3/2003 | Sonksen | 370/474 |
| 2004/0017130 A1 | | 1/2004 | Wang et al. | |
| 2004/0083385 A1 | | 4/2004 | Ahmed et al. | |

OTHER PUBLICATIONS

Intel, "Intel IXP1200 Network Processor Family", *Hardware Reference Manual*, (Dec. 2001), 1-124.
Intel, "IXP1200 Network Processor—Software Reference Manual", Part No. 278306-005, (Sep. 2000), 1-131.
Johnson, Erik, et al., "IXP1200 Programming—The Microengine Coding Guide for the IntelÂ® Network Processor Family", *Intel Press*, (2002), Chapters 2, 4, 5, and pages 112.

* cited by examiner

*Primary Examiner* — Dhairya A Patel

(57) ABSTRACT

A method and apparatus to improve packet processing is disclosed.

42 Claims, 3 Drawing Sheets

METHOD AND APPARATUS FOR IMPROVING PACKET PROCESSING

BACKGROUND

Network processors may process network information in the form of packets. Processing packets may comprise, for example, sending and receiving packets across a network. The flow of network traffic may be dynamic, and the ability of a network processor to perform packet processing may be affected by the current state of the network. A need exists for a network processor that is capable of adapting to network variations without unduly burdening the performance of packet processing by the network processor.

BRIEF DESCRIPTION OF THE DRAWINGS

The subject matter regarded as embodiments of the claimed subject matter is particularly pointed out and distinctly claimed in the concluding portion of the specification. Embodiments of the claimed subject matter, however, both as to organization and method of operation, together with objects, features, and advantages thereof, may best be understood by reference to the following detailed description when read with the accompanying drawings in which:

DETAILED DESCRIPTION

Embodiments of the claimed subject matter may comprise a method and apparatus to improve packet processing over a network. A network device may incorporate one or more processors, such as a network processor, to process packets, which may comprise sending and/or receiving packets, for example. Many network processors, such as an Intel® IXP1200 based network processor, have the capability to be programmed after implementation in a device such as a network device. This ability to be programmed may result in advantages over non-programmable processors, such as ASIC (Application Specific Integrated Circuit) processors. The methods of packet processing used by one or more network processors may result in a variation in the speed at which packets are processed. In one embodiment of the claimed subject matter, the processing technique used by one or more network processors of a network device may be altered, based on such factors as network traffic patterns or type of packets being processed, for example. As a result of these alterations, a network device may make more efficient use of processing capabilities, and therefore reduce overall system latency.

One embodiment of the claimed subject matter may monitor the state of network traffic through a network device. The embodiment may select and load algorithms into the one or more network processors based on a number of criteria, including the state of network traffic. These one or more algorithms may be loaded into the instruction store of the one or more network processors, although the embodiments are not limited in this context.

It is worthy to note that any reference in the specification to "one embodiment" or "an embodiment" means that a particular feature, structure, or characteristic described in connection with the embodiment is included in at least one embodiment of the claimed subject matter. The appearances of the phrase "in one embodiment" in various places in the specification are not necessarily all referring to the same embodiment.

Numerous specific details may be set forth herein to provide a thorough understanding of the embodiments of the claimed subject matter. It will be understood by those skilled in the art, however, that the embodiments of the claimed subject matter may be practiced without these specific details. In other instances, well-known methods, procedures, components and circuits have not been described in detail so as not to obscure the embodiments of the claimed subject matter. It can be appreciated that the specific structural and functional details disclosed herein may be representative and do not necessarily limit the scope of the claimed subject matter.

Figure 1:
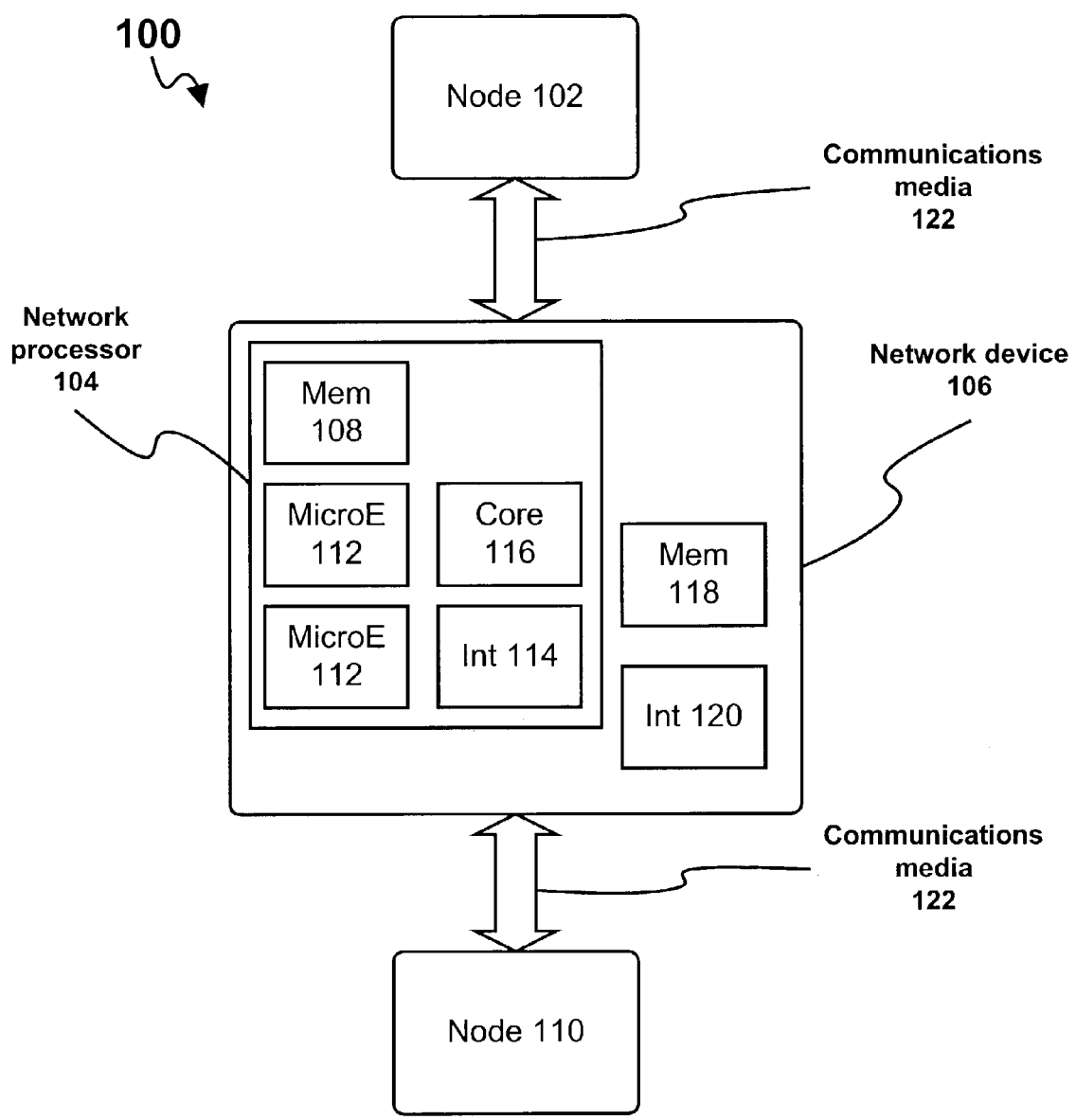
FIG. 1 is a system suitable for practicing one embodiment of the claimed subject matter.

Referring now in detail to the drawings wherein like parts are designated by like reference numerals throughout, there is illustrated in FIG. 1 a system suitable for practicing one embodiment of the claimed subject matter. FIG. 1 is a block diagram of a system 100 comprising a network device coupled by one or more communications media to a number of network nodes. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth. A network device, in this context, may comprise any type of network node.

More particularly, system 100 may comprise a source node 102 and destination node 110, which may be coupled to network device 106. Source node 102, network device 106, and destination node 110 may be connected by communications media 122, as shown. Although FIG. 1 shows only two nodes connected to the network device 106, it can be appreciated that any number of network nodes may be used in system 100 and still fall within the scope of the claimed subject matter. Furthermore, the terms "connection" and "interconnection," and variations thereof, in this context may refer to physical connections and/or logical connections.

In one embodiment of the claimed subject matter, system 100 may comprise a packet-switched network. Packet switching in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions and packet formats by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification").

In one embodiment of the claimed subject matter, network device 106 may comprise a multiservice switch, broadband access platform, web switch or a network appliance, for example, and may perform such functions as layer 2/3 forwarding, protocol conversion or firewalling, for example. In one embodiment, network device 106 may be comprised of a network processor 104, such as the Intel® IXP1200 Network Processor. Network device 106 may also comprise one or more types of memory 118, which may include, for example, Synchronous Dynamic Random Access Memory (SDRAM) and a Static Random Access Memory (SRAM), for example, and one or more interfaces 120, which have the capability to communicate with one or more other devices. One or more of the components of network device 106 may communicate through one or more bus interfaces (not shown) such as a PCI bus, for example. Network processor 104 may be comprised of one or more types of memory 108, such as SRAM or SDRAM, for example, and one or more types of interfaces 114, which may include a bus interface, for example. Network processor 104 may additionally include a processor core 116, which may include an Intel® StrongARM® Core (ARM is a trademark of ARM Limited, United Kingdom). Processor core 116 may also include a central controller (not shown) that assists in loading code for other resources of the network processor, for example, and performs other general-purpose computer type functions such as handling protocols, exceptions, and extra support for packet processing. Processor 116 may have an operating system. Through the operating system the processor 116 can call functions to operate on one or more microengines 112. Network processor 104 may include one or more microengines 112. One or more microengines 112 may include memory (not shown) that may have the capability to store instructions, for example, which may be referred to as the instruction store or fast path instruction store, which, in one embodiment comprises on-chip SRAM based memory that has the capability to store 2 Kilobytes of data, which may comprise instructions. In one embodiment, there are six microengines, and each microengine includes the capability to process four program threads. The six microengines may operate with shared resources including memory system 108 and bus interface 114, for example, although alternative configurations exist.

Figure 2:
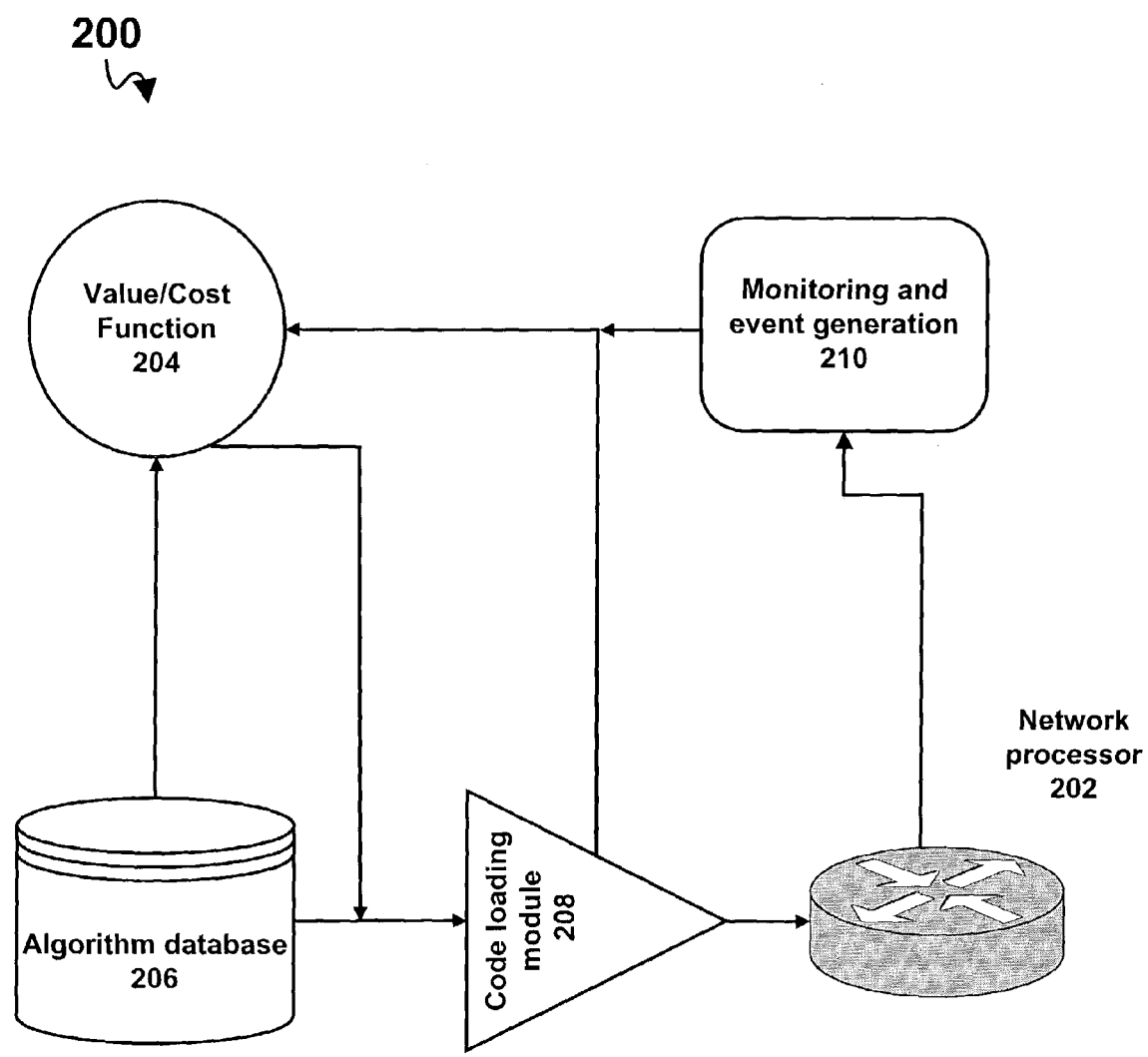
FIG. 2 is a block diagram of a network processor management system in accordance with one embodiment of the claimed subject matter.

FIG. 2 illustrates a block diagram of a method of improving packet processing in accordance with one embodiment of the claimed subject matter. FIG. 2 illustrates a system 200 that incorporates functionality that may be implemented as software executed by a processor, hardware circuits or structures, or a combination of both. The processor that executes the software may be a general-purpose or dedicated processor, such as a processor from the family of processors made by Intel Corporation, or one or more of the processors described previously in reference to network processor 104 of FIG. 1. The software may comprise programming logic, instructions or data to implement certain functionality for an embodiment of the claimed subject matter. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the claimed subject matter, the media may store programming instructions in a compressed and/or encrypted format, as well as instructions that may have to be compiled or installed by an installer before being executed by the processor. Alternatively, an embodiment of the claimed subject matter may be implemented as specific hardware components that contain hard-wired logic for performing the recited functionality, or by any combination of programmed general-purpose computer components and custom hardware components.

In one embodiment of the claimed subject matter, system 200 may comprise a database of algorithms 206. One or more of the algorithms stored in this database may comprise code designed for implementation in instruction store of one or more microengines, such as microengines 112 of network processor 104 of FIG. 1. The instruction store has the ability to store a limited amount of data, and this data typically comprises one or more packet processing algorithms. The instruction store may alternatively be referred to as a fast path packet processing store. The database of algorithms 206 may be arranged in any manner, such as relational, hierarchical or flat, for example. Organization of the algorithms may be in any manner that provides the capability to find algorithms based on one or more criteria, such as the state of the network, specific functionality desired, or time of day, for example.

Processor management system 200 may include a monitoring/event generation module 210. The monitoring/event generation module may include the capability to collect statistics about a network, such as number of packets dropped by a network device or depth of internal queue for a network device, or connection rate and types of packet received, for example. Additionally, module 210 has the capability to determine hardware configuration of a device or operability information such as whether or not a component of hardware is operating properly, for example. Module 210 may include the capability to generate an event, which may also be referred to as a notification. This event may be provided to one or more other functions of system 200. The generation of an event may occur, in one embodiment, if a particular metric is collected by module 210, such as a loss of connectivity or a flow control assertion, for example. Additionally, an event may be generated by a comparison of one or more metrics to a threshold value, such as number of synthesize (syn) packets received over a particular period of time, for example. One or more metrics may be compared to a threshold in the module 210, and if the threshold was met or exceeded, in one embodiment, the module may generate an event. Threshold values may be explained in more detail in reference to FIG. 3, below.

The value function 204, in one embodiment, is a functional block that may make a determination in reference to if and when an algorithm is to be loaded into the instruction store of one or more microengines. The value function may be executed when an event is provided from module 210, for example. Upon receipt of an event, in one embodiment, the value function may select an algorithm for loading into the instruction store of one or more microengines of a network processor. Selection of an algorithm may be based on one or more of the metrics determined in functional block 210, and such factors as the number and type of algorithms available in the algorithm database 206, for example. Additionally, a cost of loading the selected algorithm may be determined by value function 204, and may comprise, for example, a time based cost that may compare the time required to load a new algorithm into the instruction store of one or more microengines with the packet processing time lost by invoking the loading process, for example.

Code loading module 208 may include the capability to load one or more selected algorithms into the instruction store of one or more microengines, for example. Module 208 may comprise a code loading technique that halts the packet processing being performed by a microengine in order to load code into the instruction store, or may comprise a technique that provides a seamless code loading that does not substantially interrupt the packet processing of a microengine.

Network processor 202 may comprise, for example, an Intel IXP1200 Network Processor, but for the functionality disclosed herein may comprise any processor that includes the capability to alter at least a portion of its processing functionality after implementation in a device, such as a network device. The structure and operation of each module of FIG. 2 may be better understood when read in conjunction with the detailed discussion of logical functionality as discussed in more detail below.

Figure 3:
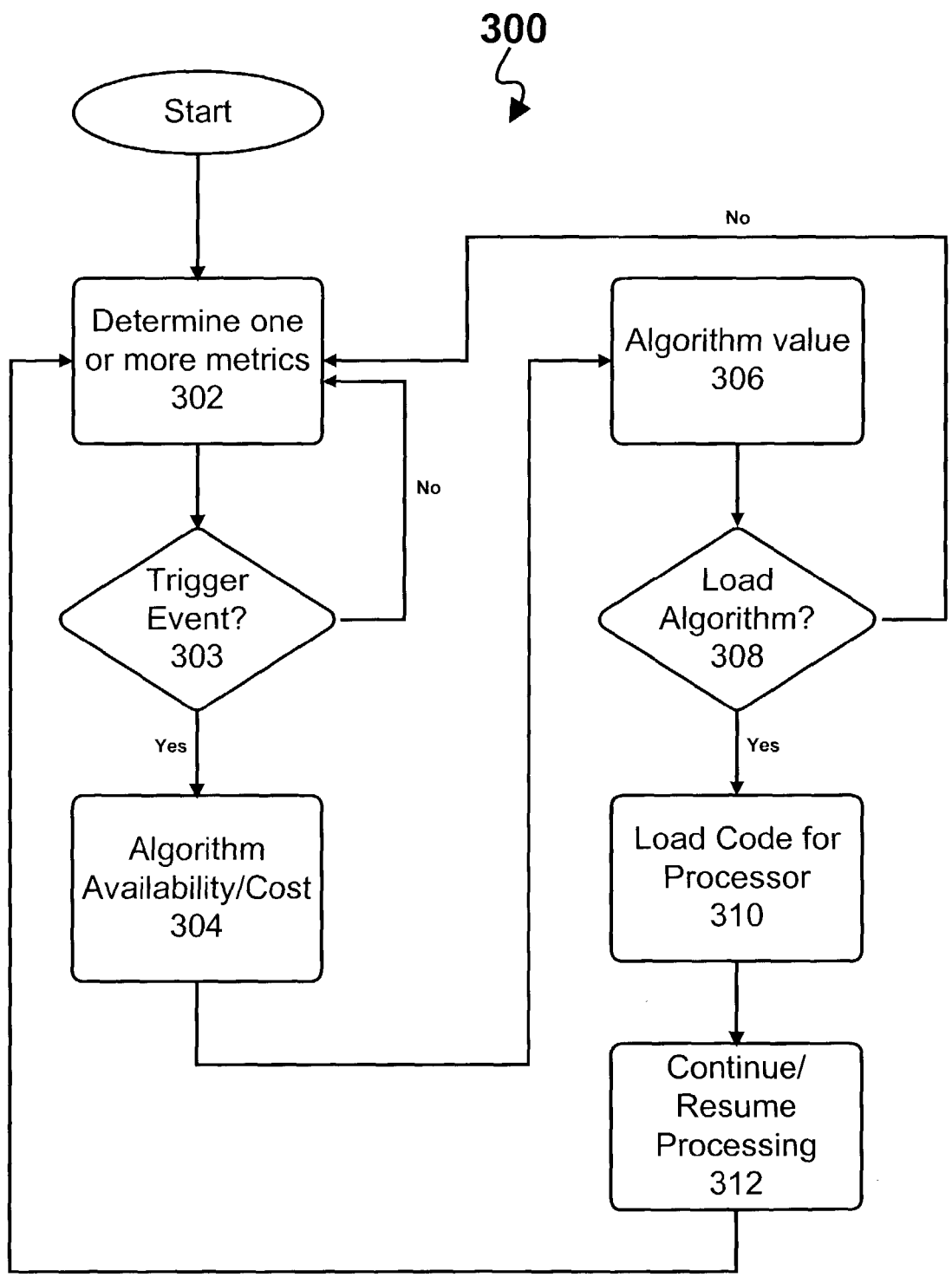
FIG. 3 is a logical flow diagram of one embodiment of a network management system in accordance with one embodiment of the claimed subject matter.

FIG. 3 is a block flow diagram of programming logic performed by a processor management system in accordance with one embodiment of the claimed subject matter. In this embodiment, the management system may refer to the software and/or hardware used to implement the functionality of one or more blocks as described herein. In this embodiment of the claimed subject matter, the management system may be implemented as part of network device 106. It can be appreciated that this functionality, however, may be implemented by any device, or combination of devices, located anywhere in a communication network or system and still fall within the scope of the claimed subject matter.

In operation, an implementation of programming logic illustrated in FIG. 3 may perform the following functions, but the order presented does not infer a particular order of execution of the following functions when implemented. One or more metrics such as those that may be determined at monitoring and event generation block 210 may be determined or received at block 302. A determination may be made at block 303 whether the one or more metrics is a triggering event. If a triggering event has occurred, at block 304 a database of algorithms may be accessed, and available algorithms and associated cost may be determined, where the determination of availability and cost may be based on one or more metrics received at block 302. An algorithm may be selected at block 304, and the value of the algorithm may be determined at block 306. A decision to load or not load the algorithm may be made at block 308, and the decision may be based on a value determined at block 306. If a decision to load the algorithm is determined at block 306, at least a portion of the algorithm is loaded at block 310. At block 312 processing may continue by at least partially using the new algorithm loaded at block 310.

In one embodiment, a determination of one or more metrics may comprise a determination of network statistics such as connection rate or types of packets received, for example. Additionally, metrics may comprise a hardware configuration of a device or operability information such as whether or not a component of hardware is not operating properly, the state of the network, other functional state of one or more components of a device coupled to a network, or such factors as timers, flow control or interrupt assertions or other interrupt based factors. Several sources of metrics exist which may be implemented in at least one embodiment of the claimed subject matter.

In one embodiment, a triggering event may comprise the occurrence of a predetermined event, such as a flow control or interrupt assertion. Additionally, a triggering event may comprise a comparison of one or more of the metrics collected to a threshold value, and if the threshold value was exceeded then it may be determined that a triggering event has occurred. A threshold may include, for example, a number of new connections over a particular period of time, or a particular time of day, for example. The threshold may be set by a user, or predetermined as a hardware configuration, for example or may be set after implementation depending on the use of the network device incorporating this logic, for example. If, in this embodiment, if the threshold is not exceeded, as determined in decision block 304, one or more of the functions of block 302 may be re-initiated, and one or more metrics may be determined or read again. Alternatively, if the threshold is not exceeded, the functions of block 302 may not be re-initiated immediately, but may not be re-initiated until the occurrence of an event, such as the passage of time or a change in network usage, for example. If however, the threshold was exceeded, the functions of block 304 may be initiated.

In one embodiment, determining available algorithms and associated cost may comprise accessing a database of algorithms, which may comprise code suitable for execution by a network processor. Alternatively, representative data may be accessed instead of entire algorithms. One or more of the algorithms or representative data may be stored on a network device 106, such as in the memory 118, for example. In this embodiment, determining associated cost may comprise determining or estimating the time required to load at least a portion of one or more algorithms into the instruction store of a network processor, although cost is not limited to a time based cost. The cost may be based on the estimate time required to load the algorithm, and the amount of lost processing due to the loading. Additionally, there may be one or more metrics determined in 302 that may affect the determination of cost. For example, if a particular type of network usage is currently underway, it may be desirable to not interrupt the network, and in this case the cost would exceed the value and the algorithm would not be loaded.

In one embodiment, value may be an evaluation of one or more available algorithms. The evaluation may comprise a comparison of an algorithm with a cost value, and with one or more metrics such as state of the network. Value may be based on a metric that caused a triggering event, but the claimed subject matter is not limited in this respect but could be based at least in part on any metric collected during operation. As an example, value may be a comparison of the time required to load an algorithm and the estimated benefit or improvement in processing that may result from utilization of an algorithm.

In this embodiment, loading code for a processor may comprises a function that loads all or a portion of the code or algorithm into the instruction store of one or more microengines, for example. Many code loading processes may be used to perform at least partially the functions of code loading as performed at block 310, but the claimed subject matter is not limited to any particular method for code loading. As stated previously in reference to module 208, the method of code loading may comprise a method that halts the packet processing being performed by a microengine in order to load code into the instruction store, or may comprise a module that provides a seamless code loading that does not substantially interrupt the packet processing of a microengine.

In this embodiment, continuing or resuming processing may comprise an instruction to a network device to resume packet processing, or to continue packet processing with the new code or algorithm loaded, which was loaded in block 310. In one embodiment, this function may not entail any instructions to a network device, such as in the case of a seamless code load, because in this particular instance processing was never interrupted and so no further input is needed. However, if processing was interrupted, this may comprise a direction to the processor to continue processing packets.

It can be appreciated that the embodiments may be applied to any network node at any level within a network hierarchy. Additionally, certain features of the embodiments of the claimed subject matter have been illustrated as described herein, however, many modifications, substitutions, changes and equivalents will now occur to those skilled in the art. It is, therefore, to be understood that the appended claims are intended to cover all such modifications and changes as fall within the true spirit of the embodiments of the claimed subject matter.

The invention claimed is:

1. A computer-implemented method to process packets, comprising:
   determining at least one network metric;
   determining a cost associated with modifying at least a portion of program instructions currently loaded into an instruction store of a processor for execution by said processor;
   determining a value associated with modifying at least a portion of the program instructions loaded into the instruction store of said processor;
   comparing said cost with said value; and
   modifying the program instructions currently loaded into the instruction store of said processor for execution by said processor based on said comparing.

2. The computer-implemented method of claim 1, wherein said determining the cost associated with said modifying comprises:
   determining a length of time required to modify said at least a portion of the program instructions loaded into the instruction store of said processor.

3. The computer-implemented method of claim 1, wherein said determining the value associated with the modifying comprises:
   determining at least one result of said modifying at least a portion of the program instructions loaded into the instruction store of said processor.

4. The computer-implemented method of claim 3, wherein said at least one result comprises a decrease in time to process a particular task.

5. The computer-implemented method of claim 3, wherein said at least one result comprises an increase in number of functions performed by said processor.

6. The computer-implemented method of claim 1, wherein said at least one network metric comprises connection rate of one or more packet types.

7. The computer-implemented method of claim 1, wherein said at least one network metric comprises time of day.

8. The computer-implemented method of claim 1, wherein said at least one network metric comprises failure of one or more devices coupled to said processor.

9. The computer-implemented method of claim 1, wherein said at least one network metric comprises receiving one or more types of packet by said processor.

10. The computer-implemented method of claim 1, wherein said at least one network metric comprises one or more resource usage statistics associated with said processor.

11. The computer-implemented method of claim 1, wherein said modifying comprises replacing said program instructions loaded into the instructions store with other program instructions.

12. An apparatus comprising:
    a processor;
    a database of available sets of program instructions for executions by a processor;
    a code loading module to replace at least one set of program instructions currently loaded in a processor instruction store for execution with at least one, but not all, of the sets of program instructions in the database, and
    a module to:
       determine at least one result of loading said at least one set of program instructions;
       compare said at least one result to at least one of: said metric and a cost associated with a loading said at least one set of program instructions; and
       determine a value associated with loading said at least one set of program instructions based at least in part on said comparison; and
    wherein based on the value, the code loading module loads said at least one of the sets of program instructions to the instruction store of the processor for execution.

13. The apparatus of claim 12, wherein said monitoring module is to survey multiple network devices.

14. The apparatus of claim 12, wherein said at least one metric comprises connection rate.

15. The apparatus of claim 12, wherein said at least one metric comprises time of day.

16. The apparatus of claim 12, wherein said at least one metric comprises failure of one or more networked devices.

17. The apparatus of claim 12, wherein said at least one metric comprises receiving one or more types of packet.

18. The apparatus of claim 12, wherein said at least one metric comprises one or more resource usage statistics.

19. The apparatus of claim 12, wherein said cost comprises an amount of time required to load said at least one set of program instructions.

20. The apparatus of claim 12, wherein said at least one result comprises a decrease in time to process a particular task.

21. The apparatus of claim 12, wherein said at least one result comprises an increase in number of functions able to be performed by a network device.

22. A system, comprising:
    a source node to send a packet;
    a destination node to receive said packet;
    an intermediate node to process said packet, said intermediate node comprising:
       a processor;
       a code loading module to load packet processing program instructions to an instruction store of the processor for execution; and
       a module to:
          determine one or more results of loading said packet processing program instructions into the instruction store of the processor for execution;
          compare said one or more results to at least one of: at least one network metric and a cost associated with loading said packet processing program instructions into the instruction store of the processor; and
          determine a value associated with loading said packet processing program instructions into the instruction store of the processor based at least in part on said comparison;
       wherein based on the value, the code loading module replaces current packet processing instructions loaded into said instruction store of the processor for execution with said packet processing instructions.

23. The system of claim 22, wherein said intermediate node further comprises a monitoring module, wherein said monitoring module includes the capability to survey one or more devices coupled to the system.

24. The system of claim 22, wherein said at least one network metric comprises connection rate of one or more packet types.

25. The system of claim 22, wherein said at least one network metric comprises time of day.

26. The system of claim 22, wherein said at least one network metric comprises failure of one or more devices coupled to the system.

27. The system of claim 22, wherein said at least one network metric comprises receiving one or more types of packet by the processor.

28. The system of claim 22, wherein said at least one network metric comprises one or more resource usage statistics associated with the processor.

29. The system of claim 22, wherein said cost comprises time required to load said packet processing code.

30. The system of claim 22, wherein said results comprise a decrease in time to process a particular task.

31. The system of claim 22, wherein said results comprise an increase in number of functions able to be performed by the processor.

32. An article comprising:
    a non-transitory storage medium;
    said non-transitory storage medium including stored instructions, that when executed by a processor, result in determining one or more network metrics, determining a cost associated with modifying at least a portion of the program instructions currently loaded into an instruction store of a processor for execution,
    determining a value associated with modifying at least a portion of the program instructions loaded into the instruction store of said processor, comparing said cost with said value, and modifying the program instructions currently loaded into the instruction store for execution based on said comparison.

33. The article of claim 32, wherein said determining the cost associated with modifying comprises: determining the time required to modify said at least a portion of the program instructions loaded into an instruction store of a processor.

34. The article of claim 32, wherein said determining the value associated with modifying comprises:
    determining at least one result of said modifying at least a portion of the code of a network processor.

35. The article of claim 32, wherein said at least one result comprises a decrease in time to process a particular task.

36. The article of claim 32, wherein said one or more network metrics comprises connection rate of one or more packet types.

37. The article of claim 32, wherein said modifying comprises replacing said program instructions loaded into an instruction store with different program instructions.

38. The article of claim 32, wherein said one or more network metrics comprises time of day.

39. A computer-implemented method, comprising:
    monitoring a metric;
    comparing the metric to a first value;
    based on the comparing the metric to the first value:
        selecting a replacement set of program instructions based on the metric;
        determining a cost to replacing a set of program instructions currently loaded for execution in an instruction store of at least one of multiple programmable processing units integrated within a processor with the replacement set of program instructions;
        determining a second value representing replacement of the set of program instructions loaded for execution in the instruction store of the at least one of the multiple programmable processing units integrated within the processor with the replacement set of program instructions;
        determining whether to replace the set of program instructions loaded for execution in the instruction store of the at least one of the multiple programmable processing units integrated within the processor with the replacement set of program instructions based on the determined cost and the determined second value; and
        based on the determining whether to replace the set of program instructions loaded for execution in the instruction store of the at least one multiple programmable processing units integrated within the processor, loading the replacement set of program instructions into the instruction store of the at least one of the multiple programmable processing units integrated within the processor for execution.

40. The computer-implemented method of claim 39, wherein the cost comprises a cost based, at least in part, on an amount of time to load the replacement instructions to the instruction store.

41. The computer-implemented method of claim 39, wherein the metric comprises a network metric determined based on packets.

42. The computer-implemented method of claim 41, further comprising selecting the set of program instructions from a database storing different sets of program instructions.

* * * * *